(12) United States Patent
Wehage

(10) Patent No.: US 8,517,151 B2
(45) Date of Patent: Aug. 27, 2013

(54) EXOSKELETON BRIDGE OF DUAL-PIVOT BRAKE ALLOWING BRAKING FORCES TO TRANSMIT THROUGH CENTER PLANE OF DUAL-PIVOT BRAKE

(75) Inventor: Kristopher Wehage, Seattle, WA (US)

(73) Assignee: Tien Hsin Industries Co., Ltd., Taichung (TW)

( * ) Notice: Subject to any disclaimer, the term of this patent is extended or adjusted under 35 U.S.C. 154(b) by 125 days.

(21) Appl. No.: 13/191,549

(22) Filed: Jul. 27, 2011

(65) Prior Publication Data
US 2013/0025980 A1  Jan. 31, 2013

(51) Int. Cl.
*B62L 3/00* (2006.01)

(52) U.S. Cl.
USPC .............. 188/24.22; 188/24.12; 188/24.13; 188/24.21; 188/24.19

(58) Field of Classification Search
USPC ........... 188/24.12, 24.13, 24.21, 24.22, 24.19
See application file for complete search history.

(56) References Cited

U.S. PATENT DOCUMENTS

| | | | | |
|---|---|---|---|---|
| 4,014,408 A * | 3/1977 | Armstrong | | 188/24.15 |
| 4,482,033 A * | 11/1984 | Yoshigai | | 188/24.19 |
| 4,852,698 A * | 8/1989 | Nagano | | 188/24.19 |
| 5,188,200 A * | 2/1993 | Modolo | | 188/24.11 |
| 5,425,434 A * | 6/1995 | Romano | | 188/24.19 |
| 6,776,267 B2 * | 8/2004 | Tsai | | 188/24.19 |
| 2006/0113151 A1 * | 6/2006 | Tsai | | 188/24.12 |
| 2009/0038894 A1 * | 2/2009 | Liu et al. | | 188/24.22 |
| 2009/0078512 A1 * | 3/2009 | Edwards et al. | | 188/24.12 |
| 2010/0230215 A1 * | 9/2010 | Ginster | | 188/24.22 |

* cited by examiner

*Primary Examiner* — Bradley King
*Assistant Examiner* — Mahbubur Rashid
(74) *Attorney, Agent, or Firm* — Alan Kamrath; Kamrath IP Lawfirm, P.A.

(57) ABSTRACT

A dual-pivot brake includes first and second caliper arms linked together and disposed symmetrically with respect to each other. The dual-pivot brake further includes an exoskeleton bridge including a two-piece bridge member consisting of first and second bridge members. The first and second bridge members are interconnected together by first and second axles, respectively. The first and second caliper arms are pivotally mounted on the first and second axles respectively and selectively move toward or away from each other in the operation of the dual-pivot brake.

6 Claims, 7 Drawing Sheets

US 8,517,151 B2

EXOSKELETON BRIDGE OF DUAL-PIVOT BRAKE ALLOWING BRAKING FORCES TO TRANSMIT THROUGH CENTER PLANE OF DUAL-PIVOT BRAKE

BACKGROUND OF THE INVENTION

1. Field of the Invention

The present invention relates to a dual-pivot brake and, in particular, to an exoskeleton bridge of the dual-pivot brake.

2. Description of the Related Art

A conventional dual-pivot brake includes first and second caliper arms connected to a one-piece bridge member. The first and second caliper arms are linked together by a rocker link and are disposed symmetrically with respect to each other and selectively move towards or away from each other in the operation of the dual-pivot brake. Generally, the prior art dual-pivot brake suffers a problem in that the one-piece bridge member cannot enable loads, i.e., brake forces, to be transmitted in a center plane of the dual-pivot brake, thereby causing the first and second caliper arm to experience both twisting and bending loads and are subject to bending and torsion in the operation thereof.

The present invention is, therefore, intended to obviate or alleviate the problems encountered in the prior art.

SUMMARY OF THE INVENTION

According to the present invention, a brake is comprised of a first caliper arm, a second caliper arm, and an exoskeleton bridge. The first and second caliper arms are linked together by a rocker link and are disposed symmetrically with respect to each other. The exoskeleton bridge includes a two-piece bridge member consisting of first and second bridge members. The first and second bridge members each includes a body disposed in a symmetric and spaced relationship. The bodies of the first and second bridge members are interconnected together by first and second axles. The first and second caliper arms are pivotally mounted on the first and second axles respectively and selectively move toward or away from each other in the operation of the dual-pivot brake. The first axle is integrally formed into either the first or second bridge member, and the second axle is integrally formed into the other bridge member.

It is an object of the present invention to provide a dual-pivot brake including an exoskeleton bridge allowing brake forces to be transmitted in a center plane of the dual-pivot brake. Thereby, the first and second caliper arms of the dual-pivot brake are subject to pure bending, not bending and torsion.

It is another object of the present invention to provide a dual-pivot brake including an exoskeleton bridge having increased stiffness over the one-piece bridge construction of a conventional dual-pivot brake.

It is yet another object of the present invention to provide a dual-pivot brake including an exoskeleton bridge being a lighter weight than the one-piece bridge construction of a conventional dual-pivot brake.

DETAILED DESCRIPTION OF THE PREFERRED EMBODIMENTS

Figure 1:
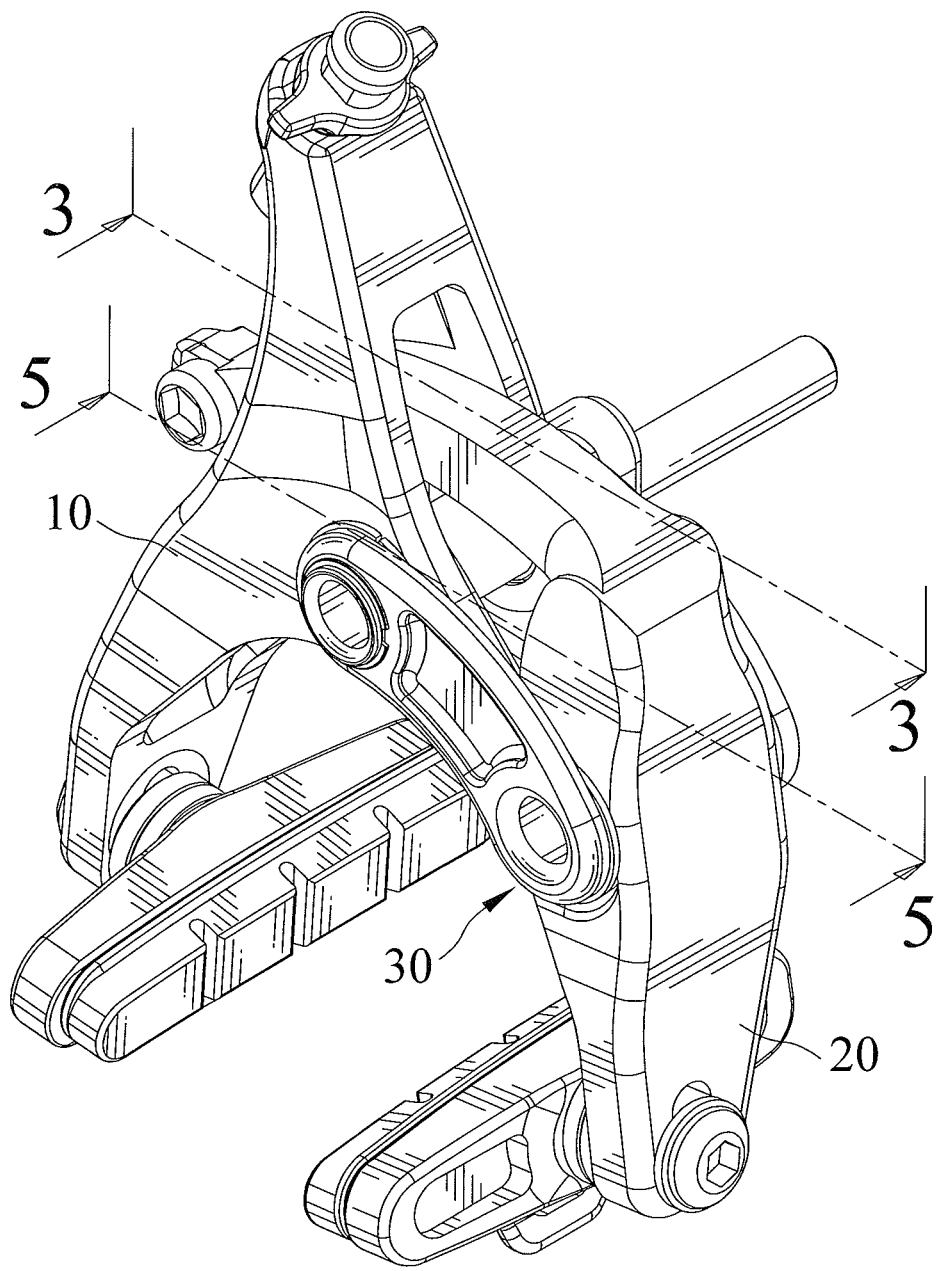
FIG. 1 is a perspective view of a dual-pivot brake in accordance with the present invention.
Figure 2:
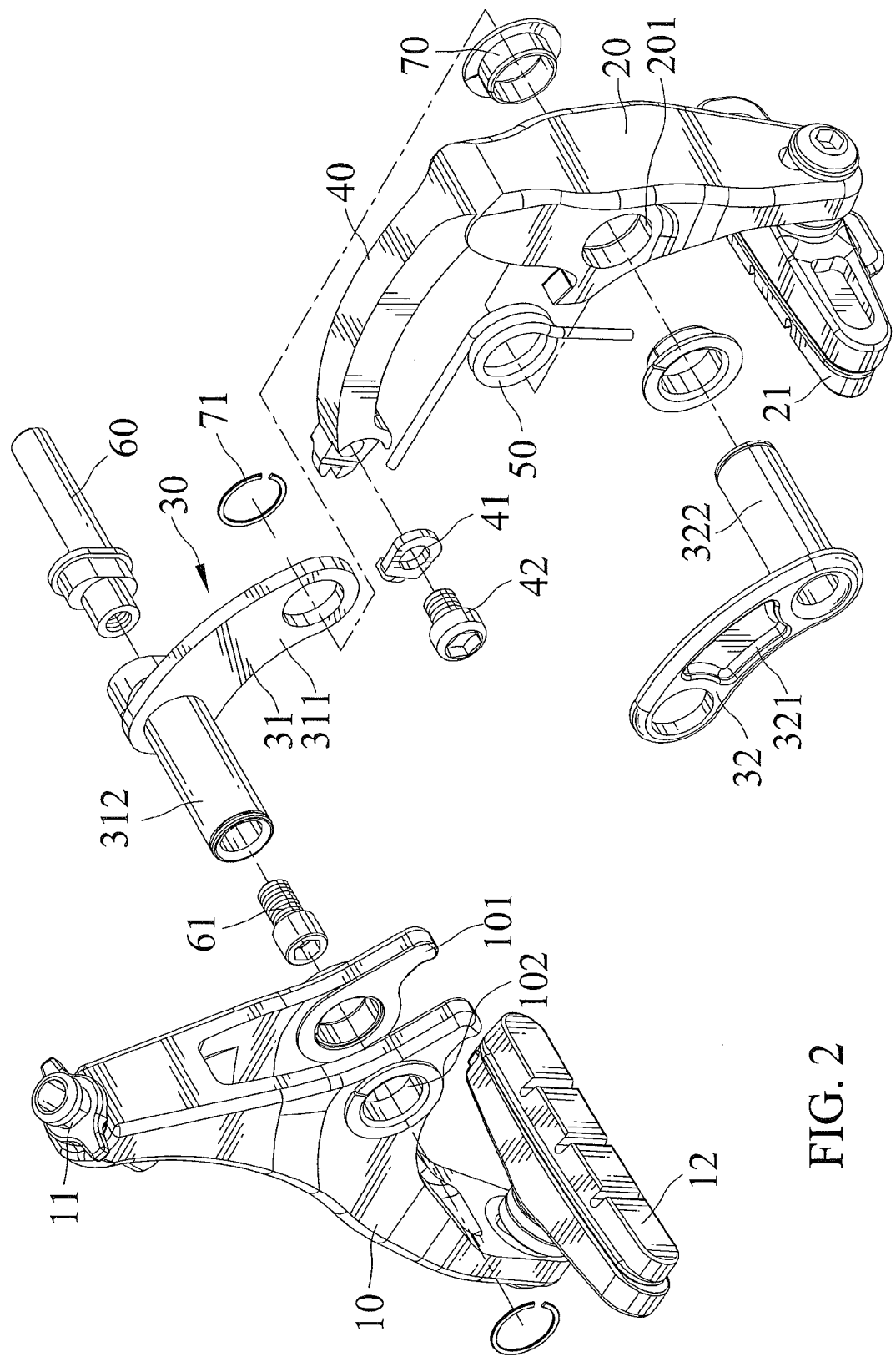
FIG. 2 is an exploded perspective view of the dual-pivot brake of FIG. 1.

FIGS. 1 through 7 show a dual-pivot brake in accordance with the present invention. The dual-pivot brake includes a first caliper arm 10, a second caliper arm 20, an exoskeleton bridge 30, and a link 40.

The first and second caliper arms 10 and 20 are linked together by a rocker link 101 and are disposed symmetrically with respect to each other. Additionally, the first and second caliper arms 10 and 20 each includes a brake pad 12 and 21 mounted thereon. The brake pads 12 and 21 are disposed symmetrically to each other. Furthermore, the first caliper arm 10 has a brake cable connected thereto. The brake cable has an end connected to an input device.

The exoskeleton bridge 30 includes a two-piece bridge member consisting of first and second bridge members 31 and 32. The first and second bridge members 31 and 32 each includes a body 311 and 321 disposed in a symmetric and spaced relationship. The bodies 311 and 321 of the first and second bridge members 31 and 32 are interconnected together by first and second axles 312 and 322, respectively. Each of the first and second axles 312 and 322 has a first end joined to the body 311 or 321 and a second end. The first caliper arm 10 is pivotally mounted on the first axle 312. The second caliper arm 20 is pivotally mounted on the second axle 322.

The first and second caliper arms 10 and 20 are pivotally mounted on the first and second axles 312 and 322, respectively. The first axle 312 is inserted into a hole 102 defined in the first caliper arm 10 to join to the first caliper arm 10. The second axle 322 is inserted into a bore 201 defined in the second caliper arm 20 to join to the second caliper arm 20.

The link 40 can facilitate relative movement between the first and second caliper arms 10 and 20. The link 40 extends from the second caliper arm 20. Additionally, the link 40 includes an end connected to the brake cable. A washer 41 is mounted on the link 40 by a fixing member 42. The brake cable is received between a wall of the link 40 and the washer 41 when attaching to the link 40.

Moreover, the dual-pivot brake includes a biasing member 50 restrained between the first axle 312 and the second caliper arm 20. Additionally, the second axle 322 is inserted through at least one loop formed by the biasing member 50 to join to the biasing member 50.

Moreover, the dual-pivot brake includes a fixing bolt 60 joined to the first axle 312. The fixing bolt 60 is utilized for mounting the dual-pivot brake on a bicycle. Additionally, the first axle 312 includes a fastener 61 inserted therein and engages with the fixing bolt 60 to join the fixing bolt 60 to the first axle 312.

Furthermore, a barrel adjuster screw 11 is mounted on the first caliper arm 10 and is disposed between the first bridge member 31 and the input device. The brake cable is inserted through the barrel adjuster screw 11 through an aperture defined therein.

Furthermore, at least one bushing 70 and at least one retain ring 71 are disposed between connections of the aforementioned elements. The aforementioned elements can also be securely connected with bolts or threaded members.

Figure 3:
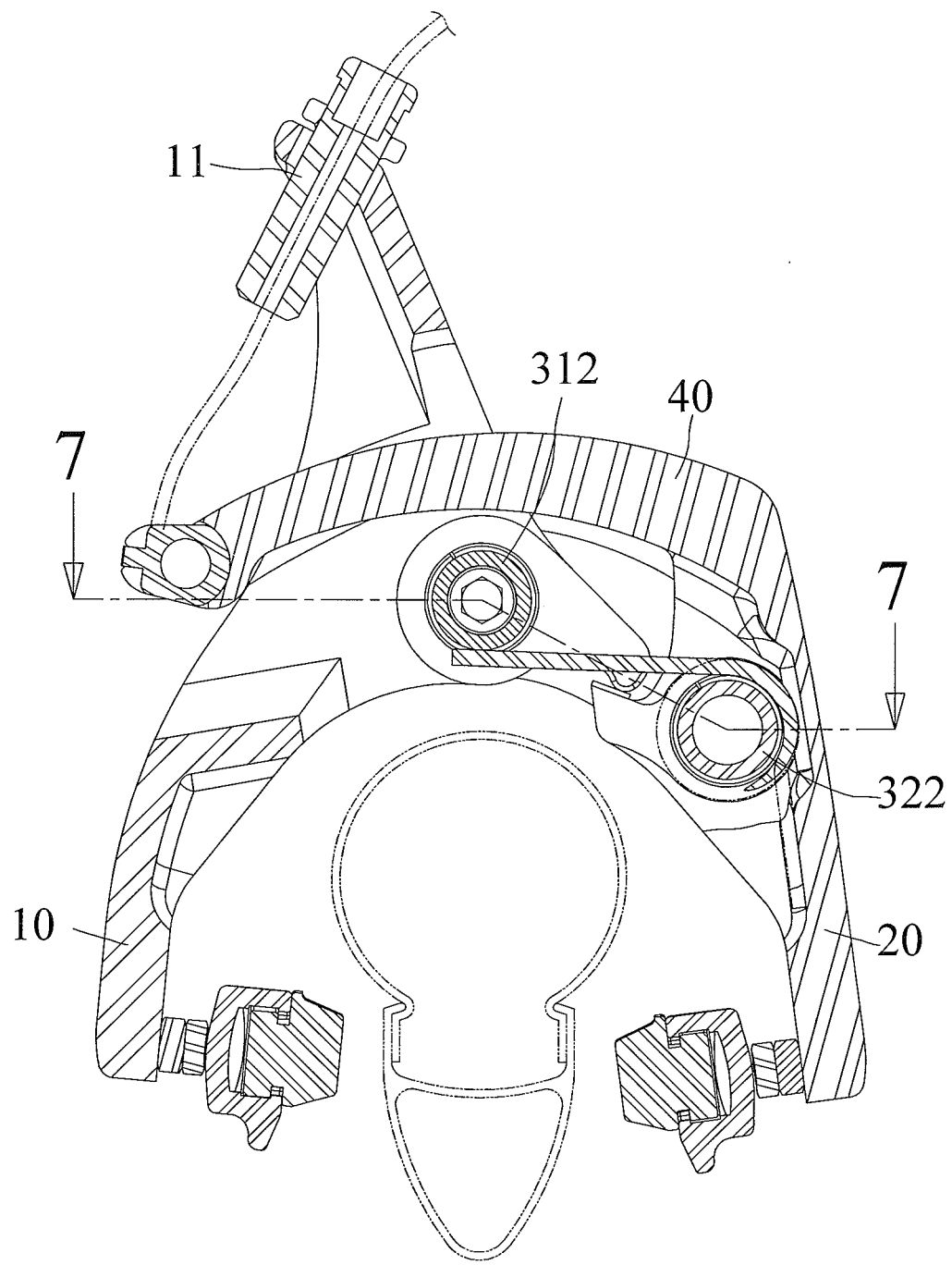
FIG. 3 is a cross-sectional view taken along line 3-3 of FIG. 1 and shows a wheel disposed between first and second caliper arms of the dual-pivot brake and a brake cable linked with the first caliper arm as well as a link of the dual-pivot brake, with the wheel and the brake cable shown in phantom.
Figure 4:
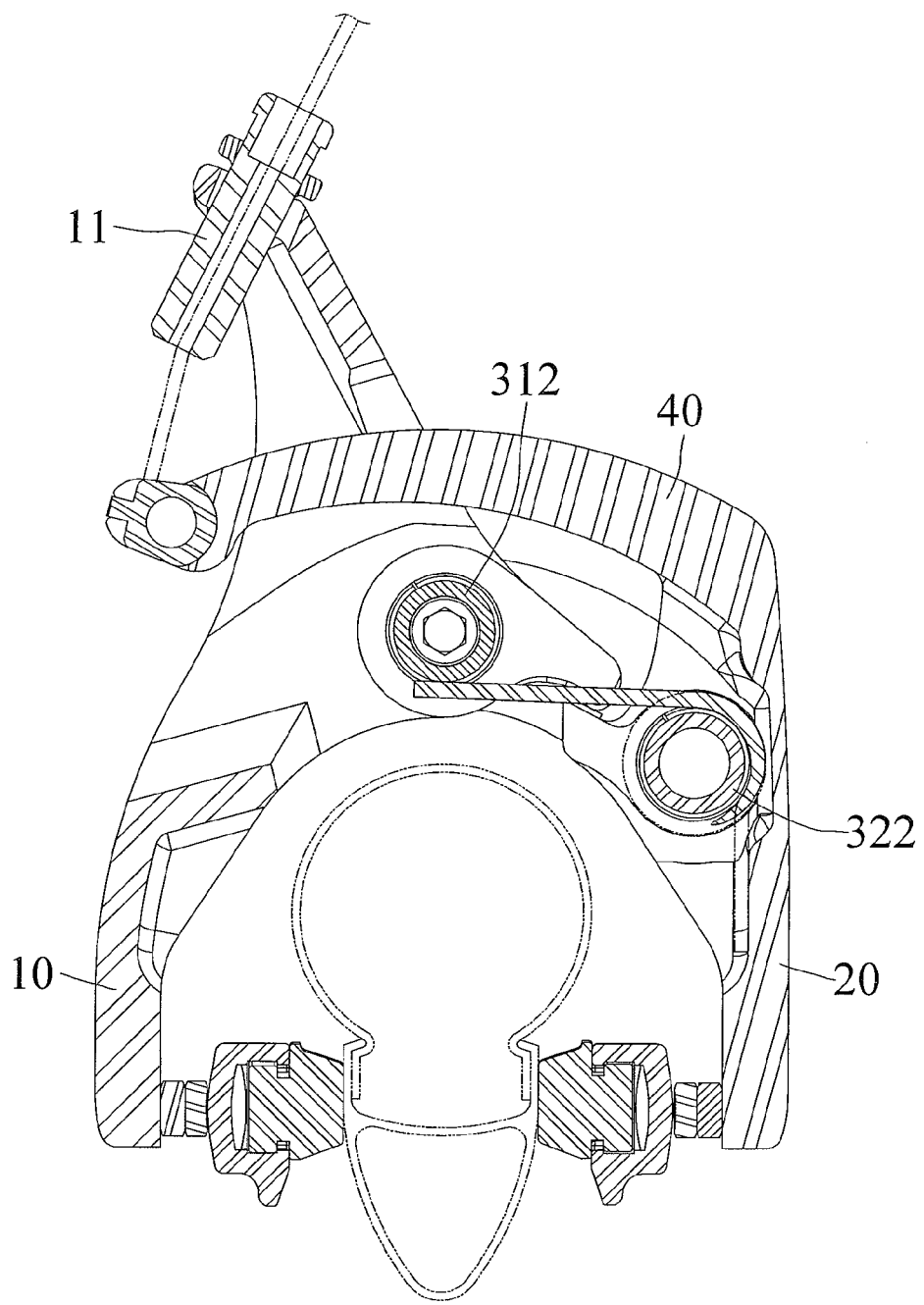
FIG. 4 is an extended cross-sectional view of FIG. 3 and shows the dual-pivot brake in a position clamping the wheel.
Figure 5:
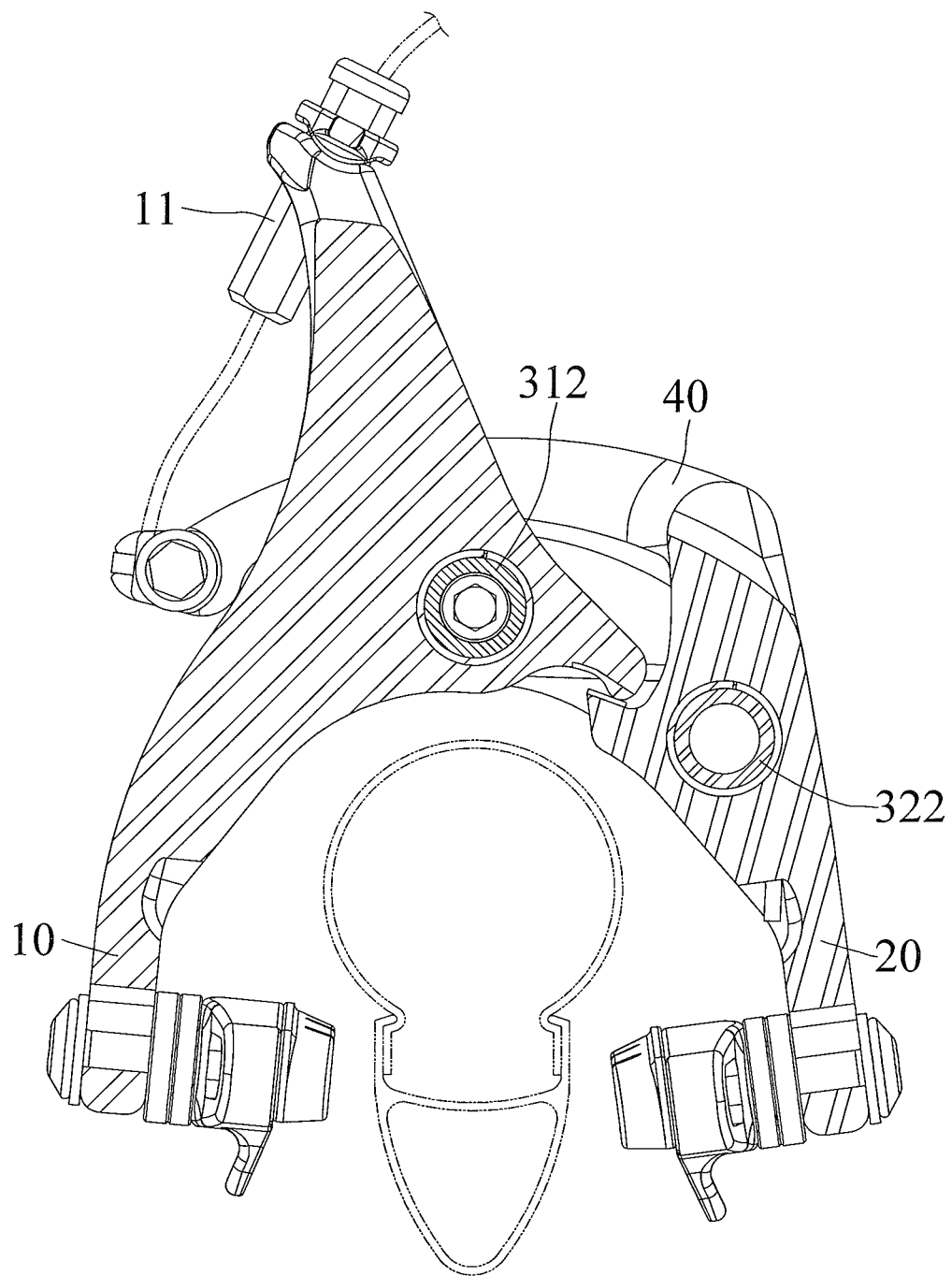
FIG. 5 is a cross-sectional view taken along line 5-5 of FIG. 1.
Figure 6:
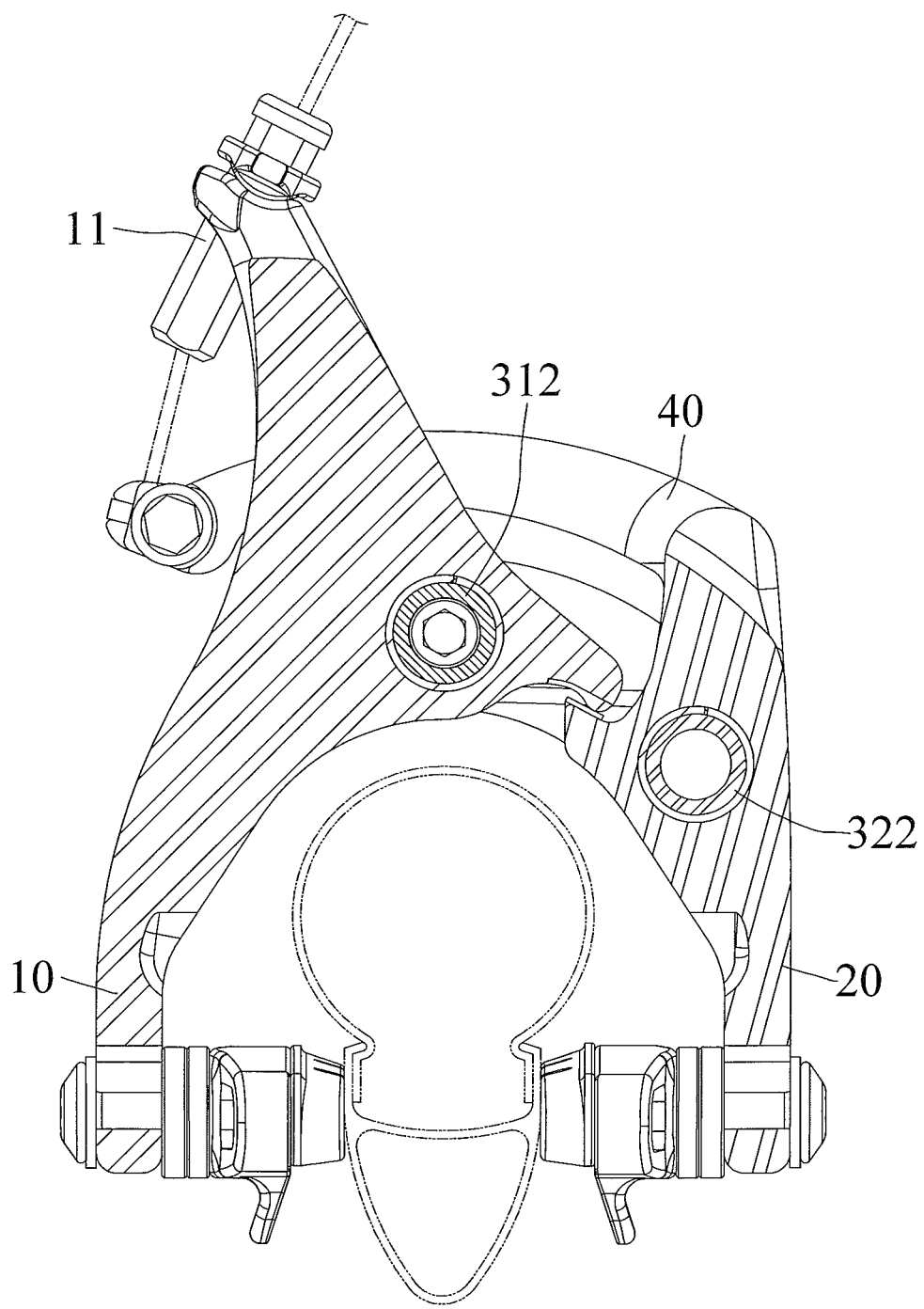
FIG. 6 is an extended cross-sectional view of FIG. 5 and shows the dual-pivot brake in a position clamping the wheel.
Figure 7:
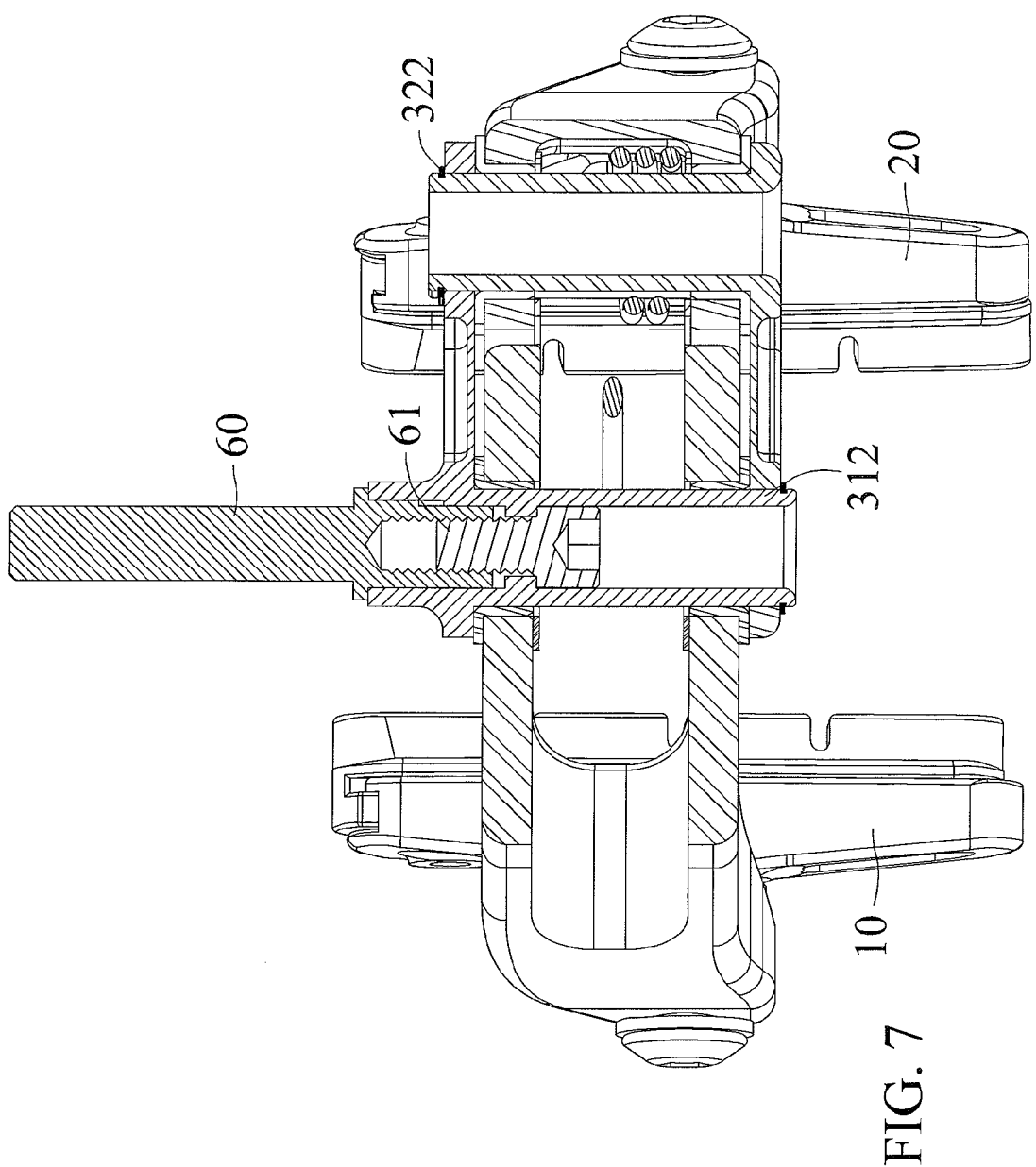
FIG. 7 is a cross-sectional view taken along line 7-7 of FIG. 3.

In the operation of the dual-pivot brake, the input device is operated, and the first caliper arm 10 pivots about the first axle 312, the second caliper arm 20 pivots about the second axle 322, and the first and second caliper arms 10 and 20 selectively move towards or away from each other. Additionally, when the dual-pivot brake is used with a wheel, the wheel is disposed between the first and second caliper arms 10 and 20, as shown in FIG. 3. FIG. 4 shows the dual-pivot brake is in a position clamping the wheel.

In view of the forgoing, the exoskeleton bridge 30 is a two-piece element including the first and second bridge members 31 and 32. The first and second bridge members 31 and 32 each includes the body 311 and 321 which are disposed in a symmetric and spaced relationship. The bodies 311 and 321 of the first and second bridges 31 and 32 are interconnected together by the first and second axles 312 and 322. Each of the first and second axles 312 and 322 has a first end joined to the body 311 or 321 and a second end. The first caliper arm 10 is pivotally mounted on the first axle 312. The second caliper arm 20 is pivotally mounted on the second axle 322. As a result, brake forces are transmitted in a center plane of the dual-pivot brake to the first and second caliper arms 10 and 20, and the first and second caliper arms 10 and 20 are subject to pure bending, not bending and torsion. Another advantage is that each of the first and second bridge members 31 and 32 of the exoskeleton bridge 30 has a thinner wall than a one-piece conventional bridge, thereby saving weight. This also means the exoskeleton bridge 30 can have a higher stiffness to weight ratio. Yet another advantage is that each of the first and second bridge members 31 and 32 of the exoskeleton bridge 30 can be made wider, but have a thinner wall, in order not to add weight and to have a higher moment of inertia than a narrower one-piece conventional bridge, thereby enhancing the braking function. Additionally, the first and second bridge members are interlocked together, thereby increasing the stiffness of the exoskeleton bridge 30 and enhancing the braking function.

While the specific embodiments have been illustrated and described, numerous modifications come to mind without significantly departing from the spirit of invention, and the scope of invention is only limited by the scope of the accompanying claims.

What is claimed is:

1. A dual-pivot brake comprising:

a first caliper arm;

a second caliper arm linked to and disposed symmetrically with the first caliper arm;

an exoskeleton bridge including first and second, separate, bridge members, with the first and second bridge members each including a body disposed in a symmetric and spaced relationship, with the bodies of the first and second bridge members interconnected together by first and second axles, wherein the first and second caliper arms are pivotally mounted on the first and second axles respectively, with the first and second caliper arms selectively moving towards or away from each other in operation, wherein the first axle is integrally formed into the first bridge member, wherein the second axle is integrally formed into the bridge member; and a biasing member restrained between the first axle and the second caliper arm, with first and second distal ends of the biasing member abutting against the first axle and the second caliper arm respectively in order to be restrained between the first axle and the second caliper.

2. The dual-pivot brake as claimed in claim 1, wherein the first caliper arm has a brake cable connected thereto, with the brake cable having an end connected to an input device, with the first caliper arm pivoting about a first pivotal connection in response to operation of the input device.

3. The dual-pivot brake as claimed in claim 2, wherein the first caliper arm includes a barrel adjuster screw mounted thereon and disposed between a first link member and the input device, and wherein the brake cable is inserted through the barrel adjuster screw, with the barrel adjuster screw including an aperture defined therein receiving the brake cable.

4. The dual-pivot brake as claimed in claim 1, wherein the biasing member is mounted on the second axle, with the second axle inserting through at least one loop formed by the biasing member to join to the biasing member.

5. The dual-pivot brake as claimed in claim 1 further comprising a fixing bolt joined to the first axle, with the fixing bolt utilized for mounting the dual-pivot brake on a bicycle.

6. The dual-pivot brake as claimed in claim 1, wherein the first and second caliper arms each includes a brake pad mounted thereon, with the brake pads disposed symmetrically to each other.

* * * * *